(12) United States Patent
Kamiya et al.

(10) Patent No.: US 6,557,425 B2
(45) Date of Patent: May 6, 2003

(54) TORQUE SENSOR

(75) Inventors: Haruo Kamiya, Kanagawa (JP);
Satoshi Kubosawa, Tokyo (JP);
Shigetoshi Kumazaki, Kanagawa (JP)

(73) Assignee: Unisia Jecs Corporation, Atsugi (JP)

( * ) Notice: Subject to any disclaimer, the term of this patent is extended or adjusted under 35 U.S.C. 154(b) by 0 days.

(21) Appl. No.: 09/909,017

(22) Filed: Jul. 20, 2001

(65) Prior Publication Data

US 2002/0040608 A1 Apr. 11, 2002

(30) Foreign Application Priority Data

Oct. 11, 2000 (JP) ........................................ 2000-310774

(51) Int. Cl.[7] ................................................ G01L 3/02
(52) U.S. Cl. ............................. 73/862.334; 73/862.335; 73/862.08; 180/143
(58) Field of Search ................. 73/862.334, 862.331, 73/862.333, 862.326, 862.08, 118.1, 862.335; 180/143

(56) References Cited

U.S. PATENT DOCUMENTS

| 5,390,549 A | * | 2/1995 | Dobler et al. | .......... | 73/862.331 |
| 5,394,760 A | * | 3/1995 | Persson et al. | ........ | 73/862.331 |
| 5,578,767 A | * | 11/1996 | Chikaraishi et al. | ... | 73/862.331 |
| 5,796,014 A | * | 8/1998 | Chikaraishi et al. | ... | 73/862.331 |
| 6,341,426 B1 | * | 1/2002 | Okumura | .................... | 33/1 PT |
| 6,382,034 B1 | * | 5/2002 | Yasui et al. | ............. | 73/862.08 |

FOREIGN PATENT DOCUMENTS

JP          2-132336          5/1990

* cited by examiner

Primary Examiner—Hezron Williams
Assistant Examiner—Andre Allen
(74) Attorney, Agent, or Firm—Foley & Lardner

(57) ABSTRACT

A torque sensor is comprised of a torque detection coil for detecting a torque generated between an input shaft and an output shaft by detecting a change of a relative rotational position between a cover member fixed to the input shaft and a covered member fixed to the output shaft as a change of impedance of a torque detection coil. The cover member is located between the covered member and the torque detection coil and has an outer cylinder portion which extends from an outer periphery of the cover member along a circumferential surface of the covered member.

12 Claims, 14 Drawing Sheets

TORQUE SENSOR

BACKGROUND OF THE INVENTION

The present invention relates to a torque sensor for detecting a torque generated at a rotation shaft, and more particularly to a torque sensor installed to an electric power steering apparatus.

Japanese Patent Provisional Publication No. (Heisei) 2-132336 discloses a torque sensor for detecting a torque generated at a shaft by detecting a twist quantity between first and second shafts connected through a torsion bar. More specifically, such a torque sensor is arranged to detect a change of a relative rotational position between a first induction member (covered member) on the first shaft and a second induction member (cover member) on the second shaft by detecting an impedance change of a coil set around the induction members.

SUMMARY OF THE INVENTION

However, since the conventional torque sensor is arranged to simply locate the cover member between a detection coil and the covered member, some magnetic field bypassing the cover member is generated. This bypassing magnetic field decreases a quantity of the impedance change of a coil according to the twist quantity and degrades the detection accuracy of detecting a torque generated at a shaft.

It is an object of the present invention to provide an improved torque sensor which ensures a high detection accuracy of torque detection by shutting out a magnetic field bypassing an outer periphery of a cover member.

A torque sensor according to the present invention comprises a first shaft, an elastic member, a second shaft connected to the first shaft through the elastic member, a covered member, a covered member, a detector coil and an outer cylinder portion. The covered member is fixed to the first shaft and is made of magnetic material. The covered member comprises a plurality of cutout portions formed at predetermined intervals in a circumferential direction of the covered member. The cutout portions are located on at least one of both covered-member side surfaces perpendicular to an axis of the first shaft. The cover member is fixed to the second shaft and faced with a plane including the cutout portions of the covered member. The cover member is made of conductive and non-magnetic material and comprises a plurality of cutout portions which are formed corresponding the cutout portions of the covered member. The detector coil detects a change of an overlapped quantity between the cutout portions of the covered member and the cutout portions of the cover member on the basis of a change of an impedance as a torque quantity generated between the first and second shafts. The outer cylinder portion is integrally connected to an outer periphery of the cover member, the outer cylinder portion extending from the outer periphery of the cover member along an outer circumference of the covered member.

DETAILED DESCRIPTION OF THE INVENTION

Referring to FIGS. 1 to 7, there is shown a first embodiment of a torque sensor 20 according to the present invention. This torque sensor 20 is mainly employed in an electric power steering apparatus for a vehicle.

Figure 1:
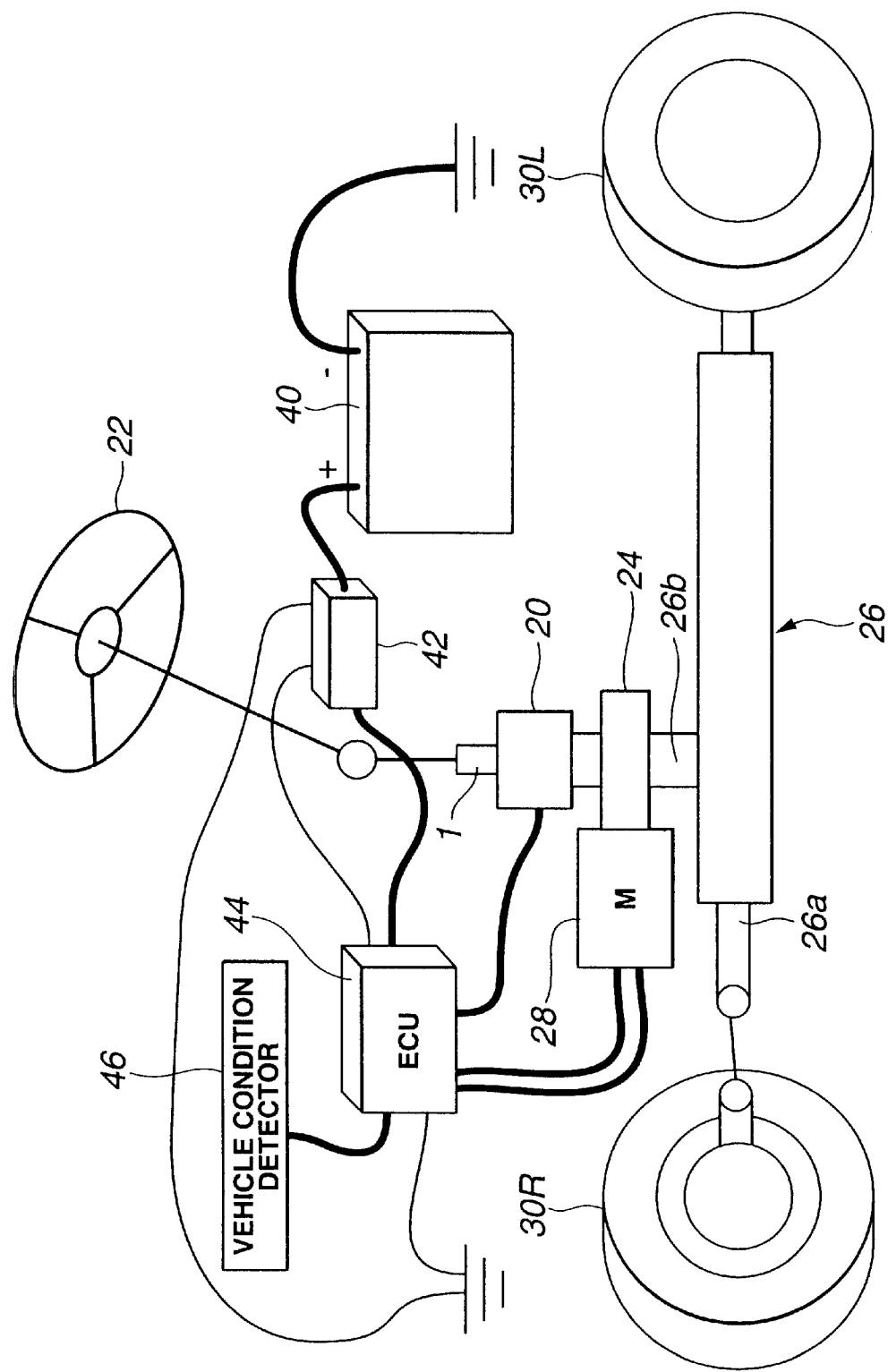
FIG. 1 is a schematic view showing a first embodiment of a torque sensor adapted to an electric power steering apparatus in accordance with the present invention.

As shown in FIG. 1, a steering wheel 22 is interlocked with left and right front wheels 30L and 30R through a rack 26a and a pinion 26b of a rack and pinion mechanism 26. By manually rotating the steering wheel 22, the rotational motion of the steering wheel 22 is converted into a linear motion of the rack 26a by the rack and pinion mechanism 26. This conversion enables the left and right front wheels 30L and 30R to be steered in the desired direction. An electric motor 28 is connected to the pinion 26b through a reduction gear 24 so as to apply an assist force to the rack 26a in addition to the steering force generated by the manual operation of a driver.

A microcomputer of an electronic control unit (ECU) 44 on the vehicle controls the operation of the electric motor 28 on the basis of a signal of the torque sensor 20 for detecting the steering force manually generated. This arrangement enables the electric motor 28 to generate the assist force for the manual steering. Further, the ECU 44 is connected to a battery 40 through a relay 42 for fail-safe.

With reference to FIGS. 2 to 7, there will be discussed the structure of the torque sensor 20 employed in the electric power steering apparatus.

Figure 2:
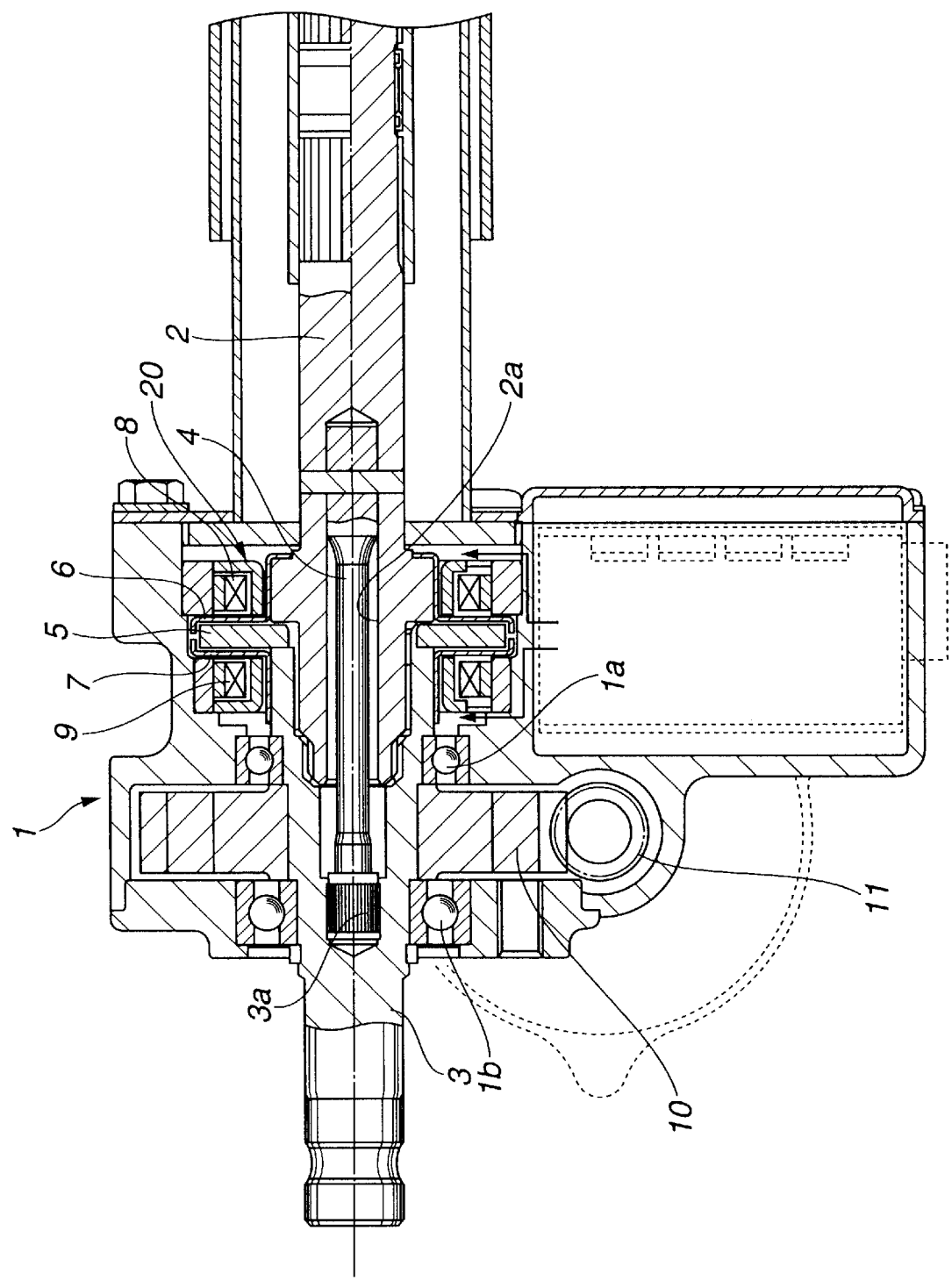
FIG. 2 is a cross sectional view showing the torque sensor of the first embodiment.

As shown in FIG. 2, the torque sensor 20 comprises a housing 1, an input shaft (second rotation shaft) 2, an output shaft (first rotation shaft) 3, a torsion bar (elastic member) 4, a covered member 5, a first cover member (torque detector side cover member) 6, a second cover member (temperature compensator side cover member) 7, a torque detector coil (detector coil) 8, a temperature compensator coil (detector coil) 9, an output shaft worm wheel 10, and a motor shaft worm 11.

More specifically, the input shaft 2 and the output shaft 3 are coaxially disposed in and supported by the housing 1 through bearings 1a and 1b, respectively. The torsion bar 4 is rotatably inserted in a shaft hole 2a of the input shaft 2. An end portion of the torsion bar 4 is fixed to the input shaft 2 in the shaft hole 2a, and the other end of the torsion bar 4 is splined to a shaft hole 3a of the output shaft 3. The steering wheel 22 is connected to the input shaft 2 so that the steering force of the steering wheel 22 is transmitted to the rack and pinion mechanism 26 installed to an end of the output shaft 3 through the input shaft 2, the torsion bar 4 and the output shaft 3. Further, the steering force is converted into the linear motion of the rack 26a and is then transmitted to the left and right front wheels 30L and 30R.

Figure 3:
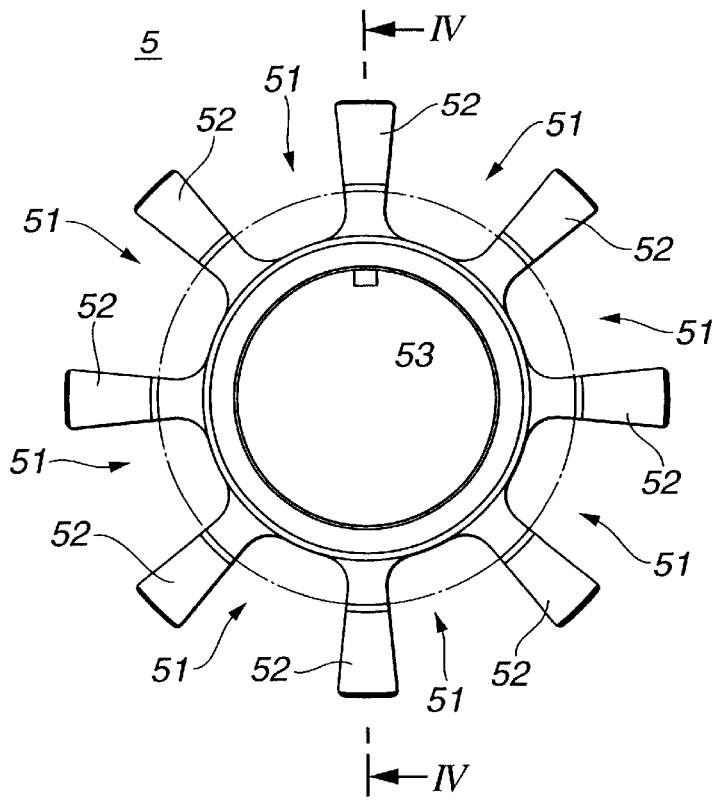
FIG. 3 is a front view showing a covered member of the torque sensor of the first embodiment.
Figure 4:
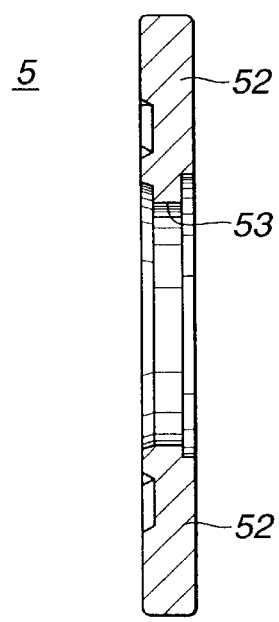
FIG. 4 is a cross sectional view taken in the direction of arrows substantially along the line IV—IV of FIG. 3.
Figure 5:
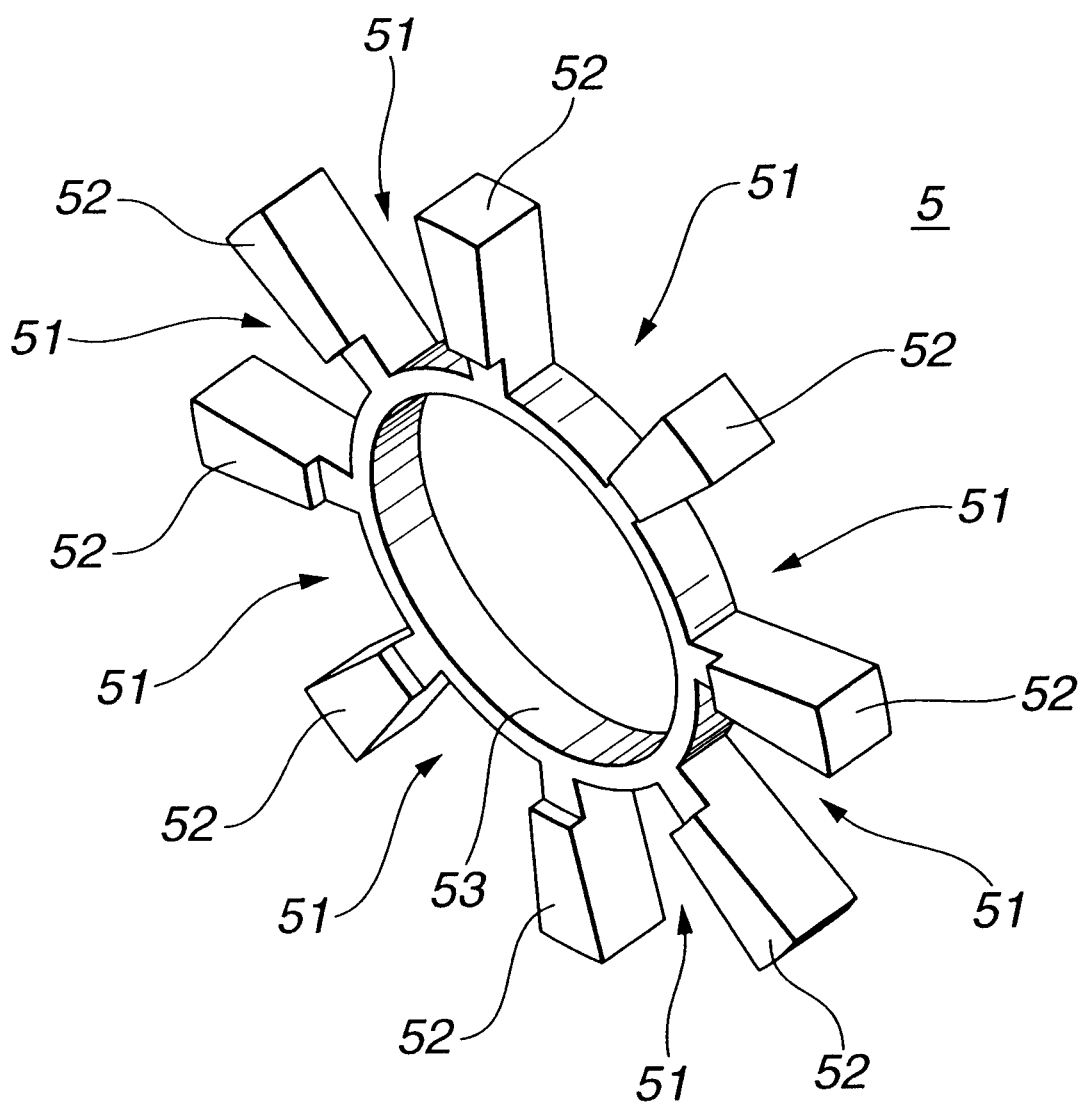
FIG. 5 is a perspective view showing the covered member of the torque sensor of the first embodiment.

The covered member 5 is made of magnetic material such as iron and constructs a magnetic path for a magnetic field generated by the torque detector coil 8 and the temperature compensator coil 9. An inner periphery of the covered member 5 is fixed to a top-end outer periphery of the output shaft 3 in the housing 1. As shown in FIGS. 3 to 5, the covered member 5 has an axial center hole 53 and a plurality of cutout portions 51 which are formed around the axial center hole 53 at predetermined angles. The angle of each cutout portion 51 is generally three times an angle of each of eight remaining portions (non-cutout portions) 52.

The torque detector coil 8 detects a torque generated between the input shaft 2 and the output shaft 3 on the basis of an impedance change due to the relative rotational displacement between the covered member 5 and the first cover member 6. The torque detector coil 8 is fixed to an inner surface of the housing 1 in a condition that the torque detector coil 8 faces with an input-shaft side plane of the covered member 5 in the axial direction. This arrangement generates the magnetic field in the magnetic path of the covered member 5.

The temperature compensator coil 9 corrects a fluctuation of the detection value of the torque, which fluctuation is caused by the change of the temperature, when torque detector coil 8 detects the torque. The temperature compensator coil 9 is fixed to an inner periphery of the housing 1 in a condition that the temperature compensator coil 9 faces with an output-shaft side plane of the covered member 5 in the housing 1 in the axial direction. This arrangement generates the magnetic field in the magnetic path of the covered member 5.

Figure 6:
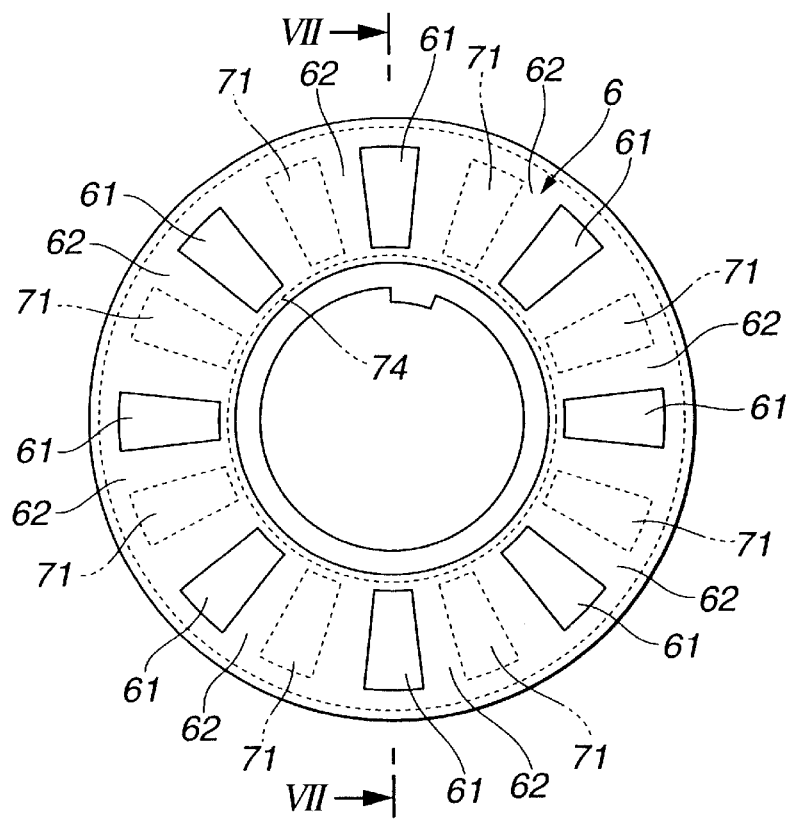
FIG. 6 is a front view showing cover members of the torque sensor of the first embodiment.
Figure 7:
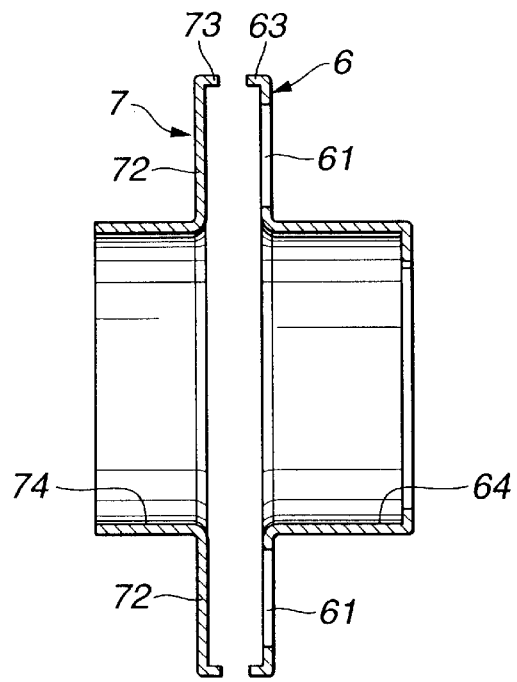
FIG. 7 is a cross sectional view taken in the direction of arrows substantially along the line VII—VII of FIG. 6.
Figure 8:
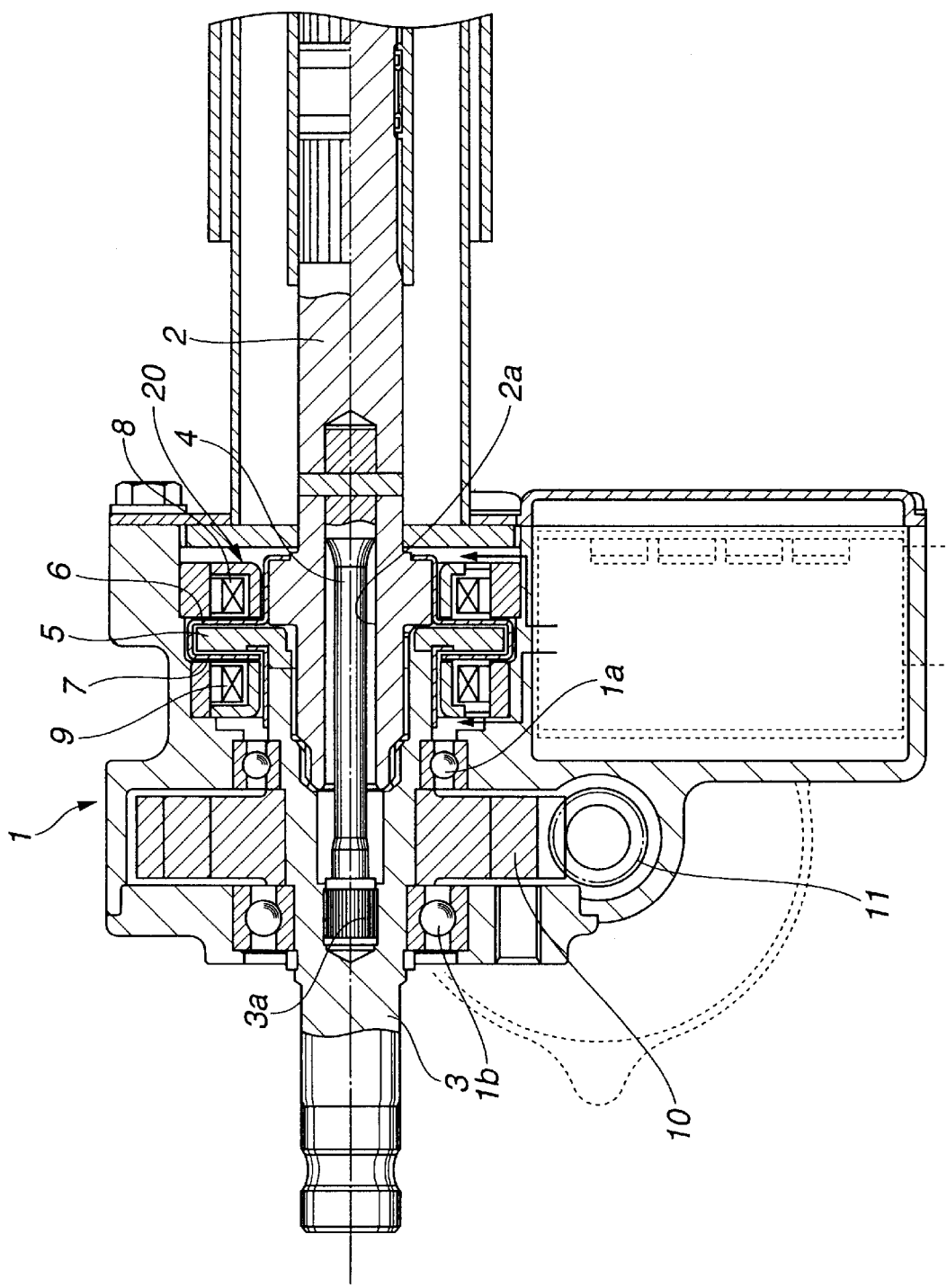
FIG. 8 is a cross sectional view showing a second embodiment of the torque sensor according to the present invention.

The first cover member 6 is installed between the covered member 5 and the torque detector coil 8 such that the inner periphery of the first cover member 6 is fixed to the input shaft 2. As shown in FIGS. 6 and 7, the first cover member 6 has an axial center hole 64 and a plurality of cutout portions (window portions) 61 formed around the axial center hole 64. The cutout portions 61 are disposed around the axial center hole 64 at predetermined angles corresponding to the angles of the cutout portions 51 of the covered member 5. Further, non-cutout portions 62 are formed around the axial center hole 64 at the predetermined angles as same as the angles of the cutout portions 61. That is, by detecting the change of overlapped quantity of the cutout portions 61 and the non-cutout portions 62 of the first cover member 6 to the cutout portions 51 and the non-cutout portions 52 of the covered member 5 on the basis of the impedance change, the torque is detected. Therefore, the first cover member 6 is made of electro-conductive and non-magnetic material such as aluminum.

The second cover member 7 is disposed between the covered member 5 and the temperature compensator coil 9 so that the inner periphery of the second cover member 7 is fixed to the output shaft 3. As shown in FIGS. 6 and 7, the second cover member 7 has an axial center hole 74 and a plurality of cutout portions (window portions) 71 formed around the axial center hole 74 at predetermined angles corresponding to the angles of the cutout portions 51 of the covered member 5. Further, non-cutout portions 72 are formed around the axial center hole 74 at the predetermined angles as same as the angles of the cutout portions 71. That is, the second cover member 7 is arranged such that a constant impedance value acting as a reference value is obtained by adjusting the overlapped quantity of the change of overlapped quantity of the cutout portions 71 and the non-cutout portions 72 of the second cover member 7 to the cutout portions 51 and the non-cutout portions 52 of the covered member 5. With reference to the reference value of the impedance value of the second cover member 7, the temperature compensated torque value is obtained from a difference between the reference value and the impedance value detected by the toque detection coil 8. Therefore, the temperature compensator cover member 7 is made of electro-conductive and non-magnetic material such aluminum.

Outer cylinders 63 and 73, which extend along the outermost periphery of the covered member 5, are formed at the outer peripheral portions of the first cover member 6 and the second cover member 7. An axial width (axial dimension) of the covered member 5 is larger than the sum of an axial width of the first cover member 6 and an axial width (axial dimension) of the second cover member 7. Accordingly, the covered member 5 functions to prevent the magnetic field generated at one of the temperature compensator coil 9 and the torque detector coil 8 from affecting the change of impedance of the other. Further, the covered member 5 functions as a magnetic path for both of the magnetic fields of the temperature compensator coil 9 and the torque detector coil 8.

FIG. 6 shows a positional relationship between the first cover member 6 and the second cover member 7 under a condition that no torque (zero torque) is applied to the input shaft 2. More specifically, under this zero-torque condition, the cutout portions 61 of the first cover member 6 are offset from the cutout portions 71 of the second cover member 7 by 22.5° in rotation angle. In other words, the covered member 5, the first cover member 6 and the second cover member 7 are positioned such that the non-cutout portions 52 of the covered member 5 are just overlapped with both of the non-cutout portions 62 of the first cover member 6 and the non-cutout portions 72 of the second cover member 7.

Next, there will be discussed the operation and the advantage of the torque sensor 20 of the first embodiment according to the present invention.

Under the torque-zero condition shown in FIG. 6, the magnetic fields of the torque detector coil 8 and the temperature compensator coil 9 are completely shut out by the non-cutout portions 62 and 72 of the torque detector cover member 6 and the second cover member 7. Therefore, a difference between the impedance values of the torque detector coil 8 and the temperature compensator coil 9 becomes almost zero (torque value is zero).

Next, when a rotation force (torque) is applied to the input shaft from the torque-zero condition shown in FIG. 6, the torsion bar 4 is twisted according to the torque quantity during the operation that the rotation force of the input shaft 2 is transmitted to the output shaft 3 through the torsion bar 4. This twist motion generates a relative rotation between the covered member 5 and the first covered member 6. More specifically, the covered member 5 is rotated in a direction where the non-cutout portions 52 of the covered member 5 are overlapped with the cutout portions 61 of the torque detector cover member 6. Accordingly, the impedance value detected by the torque detector coil 8 is varied according to this relative rotation between the covered member 5 and the torque detector cover member 6. Therefore, it becomes possible to always detect the torque value compensated in temperature by detecting a difference between the impedance value detected by the torque detector coil 8 and a constant impedance value (acting as a reference) detected by the temperature compensator coil 9.

Outer cylinder portions 63 and 73 extending along the outer circumferential surface of the covered member 5 are formed at outer peripheral portions of the first cover member 6 and the second cover member 7, respectively. These outer cylinder portions 63 and 73 can almost completely shut out the magnetic fields bypassing the outer peripheries of the first cover member 6 and the second cover member 7. Accordingly, the accuracy of the torque detection is improved by this arrangement.

Hereinafter, the other embodiments according to the present invention will be explained. In explaining the other embodiments, parts as same as those of the first embodiment are denoted by the same reference numerals of the first embodiment, and the explanation thereof is omitted herein. Only parts different from those of the first embodiment will be discussed.

Referring to FIGS. 8 to 12, there is shown a second embodiment of the torque sensor 20 according to the present invention.

In contrast to the first embodiment arranged such that an inner peripheral portion of the second cover member 7 is fixed to the output shaft 3 and are integrally rotated with the covered member 5 fixed to the output shaft 3, the second embodiment according to the present invention is specifically arranged in the first and second cover members 7 and 7. More specifically, in the second embodiment, an inner peripheral portion of the second cover member 7 is not fixed to the output shaft 3, and the outer cylinder portion 73 is further extended along the outer periphery of the covered member 5. Further the outer cylinder portion 73 is integrally connected with the outer cylinder portion 63 of the torque detector cover member 6. Therefore, the second cover member 7 integrally rotates with the first cover member 6.

Figure 9:
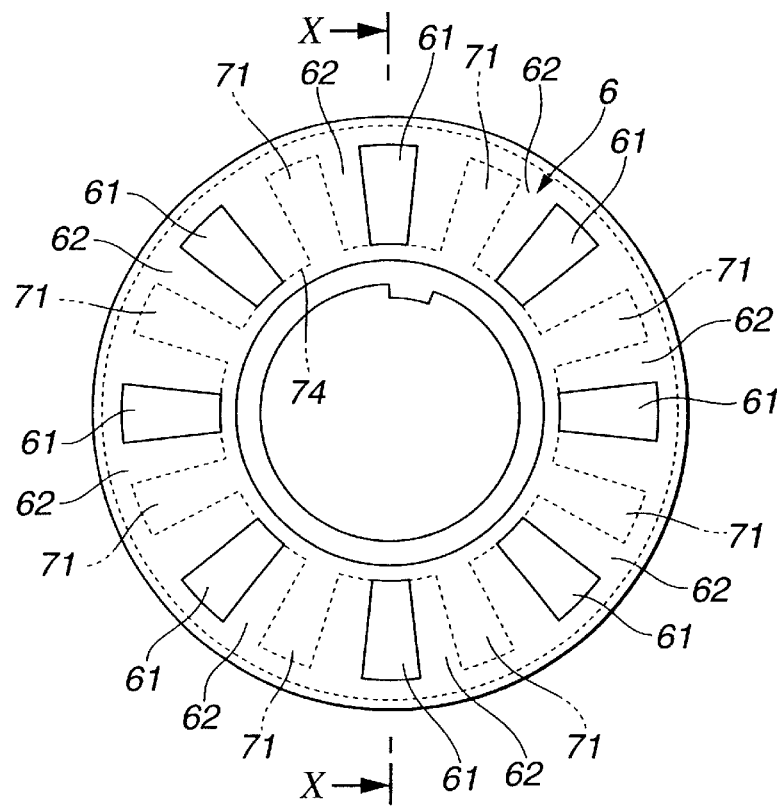
FIG. 9 is a front view showing the cover members of the second embodiment.
Figure 10:
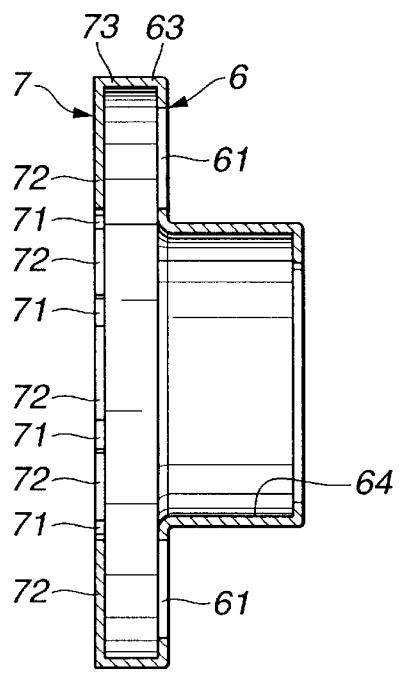
FIG. 10 is a cross sectional view taken in the direction of arrows substantially along the line X—X of FIG. 9.
Figure 11:
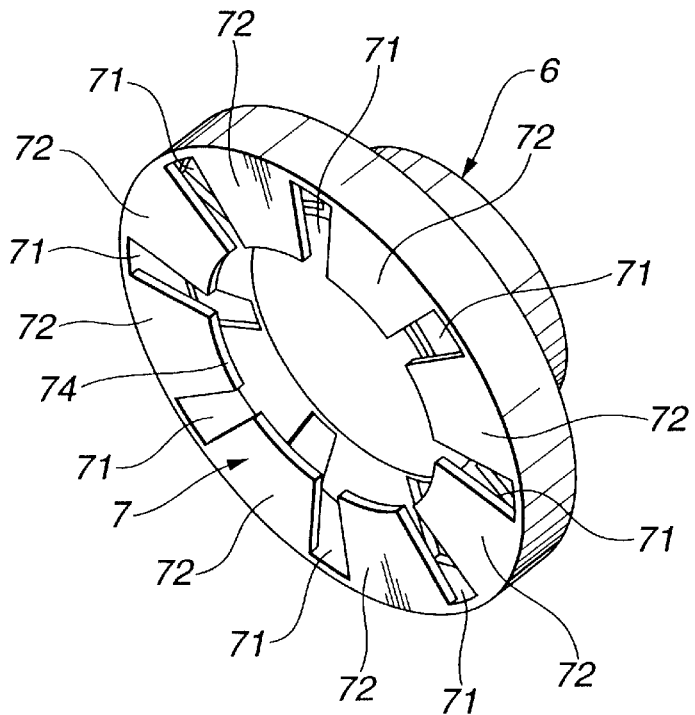
FIG. 11 is a perspective view showing the cover members of the second embodiment, as viewed from the side of a temperature-compensator side cover member.
Figure 12:
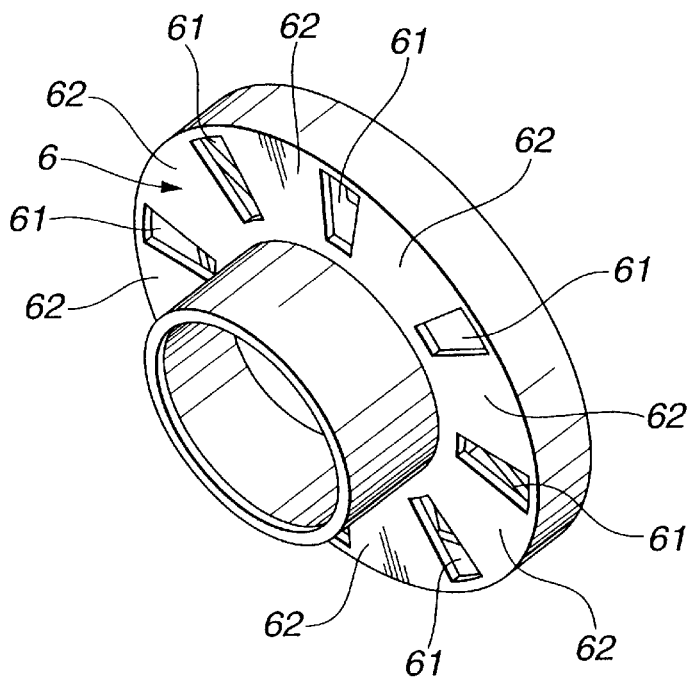
FIG. 12 is a perspective view showing the cover members of the second embodiment, as viewed from the side of a torque-detector side cover member.

As shown in FIG. 9, the cutout portions 61 of the first cover member 6 are offset from the cutout portions 71 of the second cover member 7 by 22.5° in the rotation angle. Further, when zero torque is applied to the input shaft 2, the covered member 5, the first cover member 6 and the second cover member 7 are positioned such that the non-cutout portions 52 of the covered member 5 are just overlapped with both of the non-cutout portions 62 of the first cover member 6 and the non-cutout portions 72 of the second cover member 7, respectively, as similar to the arrangement of the first embodiment. Further, the second cover member 7 is arranged such that axis near sides of the cutout portions 71 are continuous with the axial center hole 74, as shown in FIG. 11. This arrangement of the cutout portions 71 enables the covered member 5 to be inserted into a space between the first cover member 6 and the second cover member 7 through the cutout including the cutout portions 71 and the axial center hole 74.

Next, the operation and the advantage of the second embodiment will be discussed.

When the torque sensor 20 of the second embodiment is put in the zero-torque condition, the magnetic fields of the non-cutout portions 62 and 72 of the first cover member 6 and the second cover member 7 almost completely shut out the magnetic fields. Therefore, a difference between the impedance values of the torque detector coil 8 and the temperature compensator coil 9 becomes almost zero (torque value is zero).

Next, when the rotational force (torque) is applied to the input shaft 2 from the zero-torque condition, the torsion bar 4 is twisted according to the torque quantity during when the rotational force of the input shaft 2 is transmitted to the output shaft 3 through the torsion bar 4. Therefore, the relative rotation between the covered member 5 and the first cover member 6 is generated. The covered member 5 is relatively rotated in the direction where the non-cutout portions 52 of the covered member 5 are overlapped with the cutout portions 61 of the first cover member 6. Accordingly, the impedance value detected by the torque detector coil 8 is varied according to the relative rotation quantity. Further, in contrast to this, the covered member 5 is rotated in the direction where the non-cutout portions 52 of the covered member 5 are overlapped with the non-cutout portions 72 of the second cover member 7. Accordingly, the impedance values of the torque detector coil 8 and the temperature compensator coil 9 are varied in the plus direction and the minus direction, respectively from the zero-difference impedance condition.

Therefore, by detecting a difference between the plus-directional impedance value detected by the torque detector 8 and the minus-directional impedance value detected by the temperature compensator coil 9, it becomes possible to always detect the torque value compensated in temperature. Further, since it is possible to obtain a large value as a difference value between the impedance values detected by the torque detector coil 8 and the temperature compensator coil 9. More specifically, the magnitude of this large value is twice the value of the first embodiment. Therefore, it becomes possible to further improve the accuracy for the torque detection.

Furthermore, since it is possible to integrally form the first cover member 6 and the second cover member 7 due to the integral connection between the outer cylinder portions 63 and 73, it is possible to reduce the number of the parts and thereby the production cost of the torque sensor can be decreased. Additionally, due to the cutout structure of cutout portions 71 which is continuous to the axial center hole 74, the covered member 5 can be inserted into the space between the first cover member 6 and the second cover member 7. With this arrangement, it becomes possible that one of the second cover member 7 (which is integral with the first cover member 6) and the covered member 5 is fixed to one of the input shaft 2 and the output shaft 3, and the other of the second cover member 7 and the covered member 5 is fixed to the other of the input shaft 2 and the output shaft 3. This installation flexibility facilitates the assembly operation of the torque sensor 20.

Figure 13:
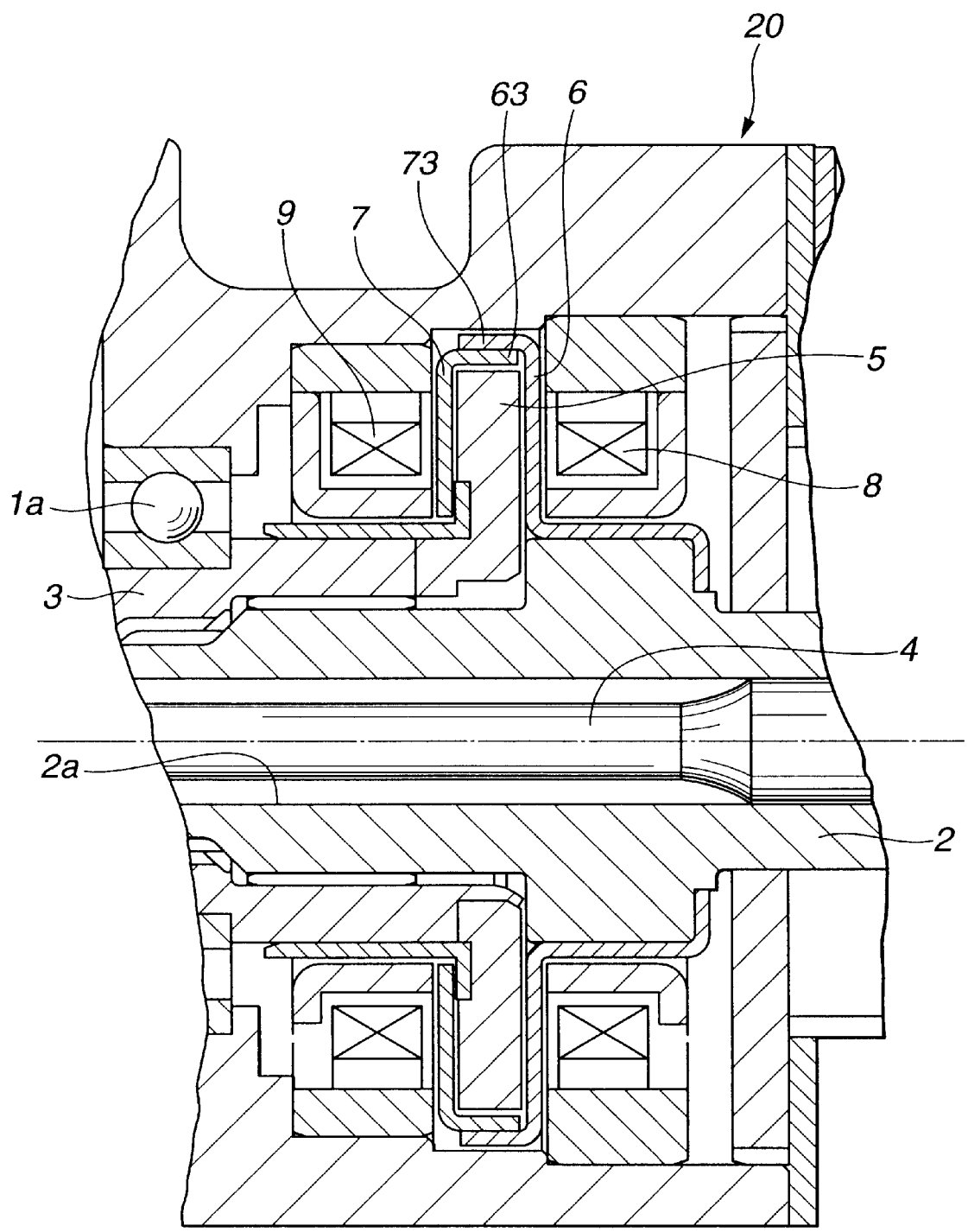
FIG. 13 is an essential cross sectional view showing a third embodiment of the torque sensor according to the present invention.
Figure 14:
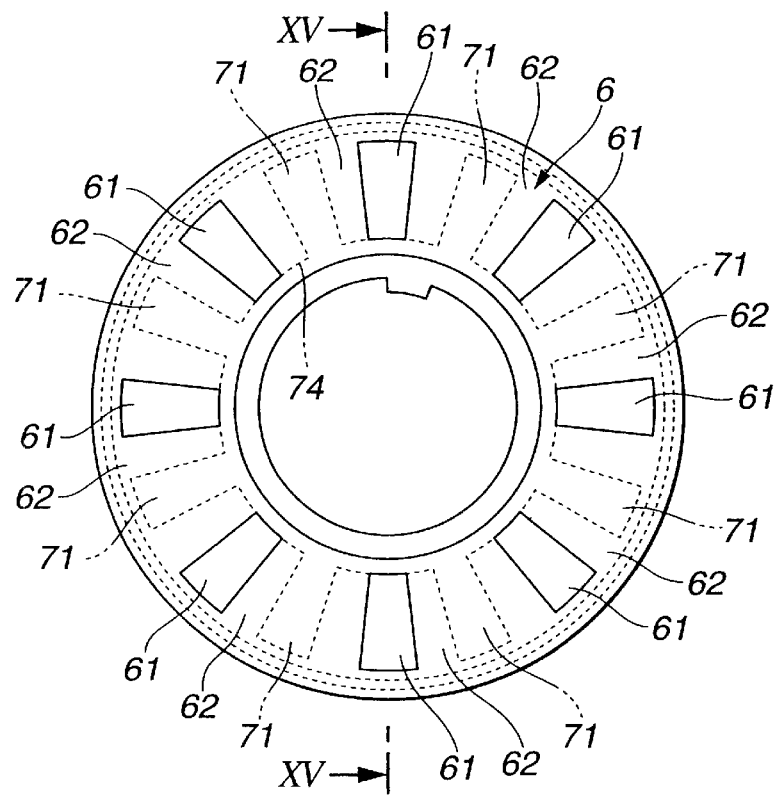
FIG. 14 is a front view showing the cover members of the third embodiment.
Figure 15:
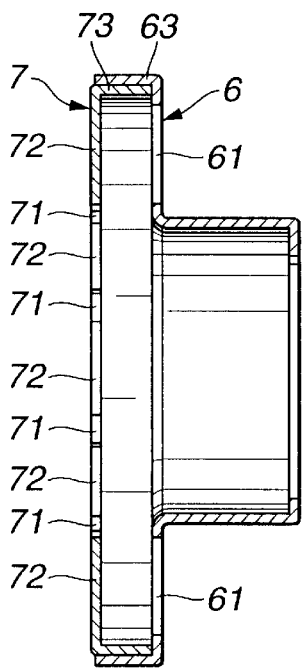
FIG. 15 is a cross sectional view taken in the direction of arrows substantially along the line XV—XV of FIG. 14.
Figure 16:
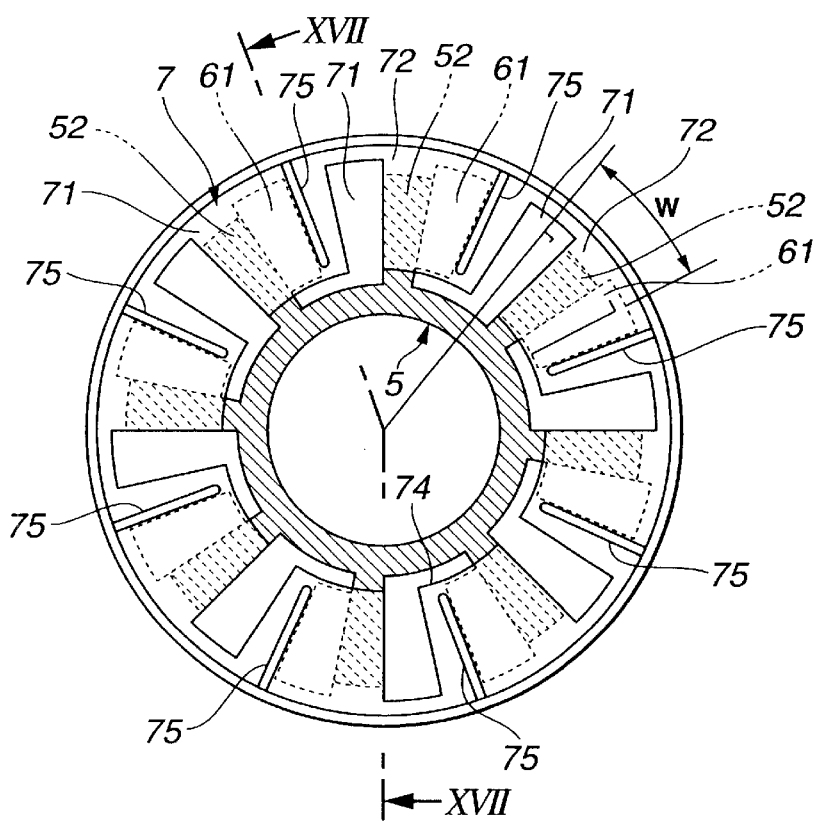
FIG. 16 is a front view showing the cover members of a fourth embodiment.
Figure 17:
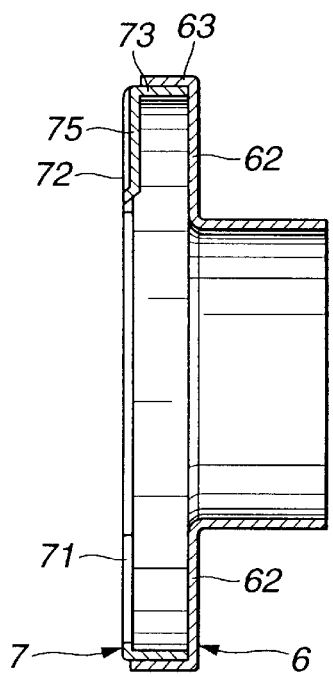
FIG. 17 is a cross sectional view taken in the direction of arrows substantially along the line XVII—XVII of FIG. 16.
Figure 18:
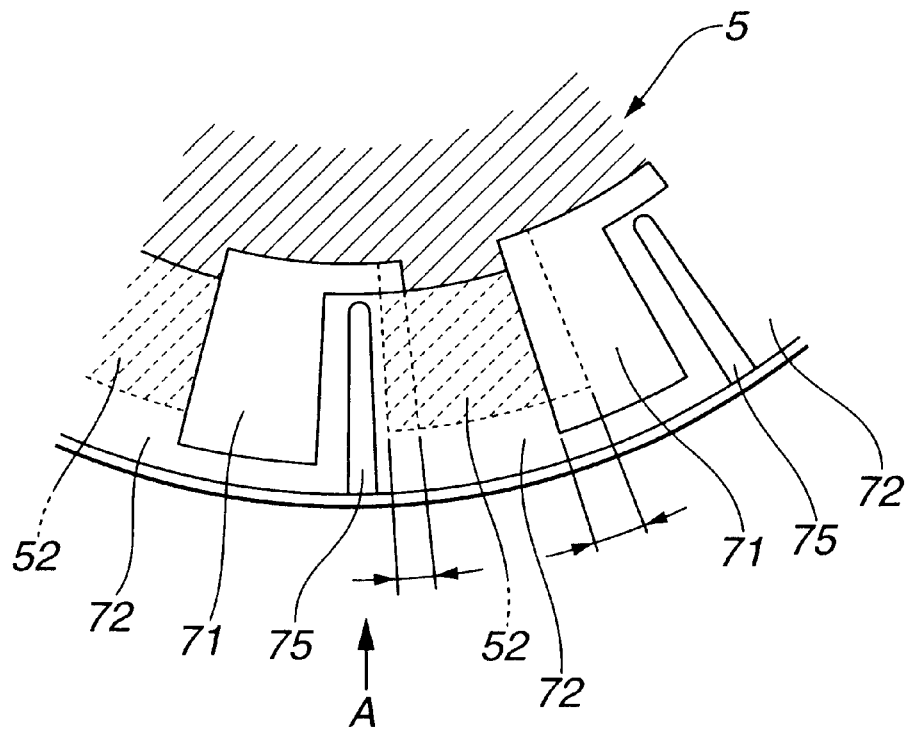
FIG. 18 is an essential enlarged view showing the cover members of the torque sensor according to the fourth embodiment of the present invention.
Figure 19:
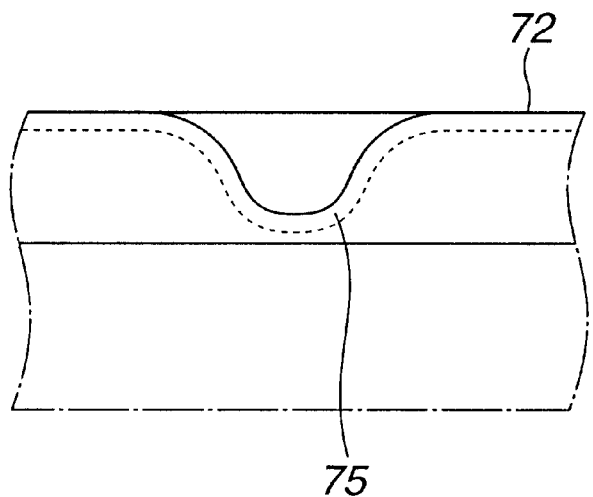
FIG. 19 is an essential enlarged view taken in the direction of the arrow A of FIG. 18.

Referring to FIGS. 13 to 15, there is shown a third embodiment of the torque sensor 20 according to the present invention.

The third embodiment is a modification of the second embodiment. More specifically, the torque sensor 20 of the third embodiment is arranged such that the outer cylinder portion 73 of the second cover member 7 is not integrally formed with the outer cylinder portion 63 of the first cover member 6 and that the outer cylinder portion 73 is overlapped with the outer cylinder portion 63 along the outer circumferential surface of the covered member 5 so as to be integrally connected with each other as shown in FIG. 13, in contrast to the arrangement of the second embodiment that the inner periphery of the second cover member 7 is not fixed to the output shaft 3 and that the outer cylinder portion 73 of the second cover member 7 is integrally connected to the outer cylinder portion 63 of the first cover member 6 so that the second cover member 7 rotates integrally with the first cover member 6.

Accordingly, although the third embodiment cannot ensure the advantage for reducing the production cost due to the decrease of the number of parts, the other advantages of the second embodiment are ensured.

Referring to FIGS. 16 to 19, there is shown a fourth embodiment of the torque sensor 20 according to the present invention. The fourth embodiment is a modification of the third embodiment.

The torque sensor 20 of the fourth embodiment is specifically arranged so that reinforcement ribs 75 are formed on the non-cutout portions 72 at equal intervals. More specifically, the reinforcement ribs 75 project from the inner surfaces of the non-cutout portions 72 toward the covered member 5 so as not to contact with the temperature compensator coil 9. Further, the reinforcement ribs 75 are disposed at a position where the non-cutout portions 52 of the covered member 5 are not contacted with the reinforcement ribs 75 as far as the second cover member 7 and the covered member 5 are rotated within the relative rotation range W.

With this arrangement of the reinforcement ribs 75 at the non-cutout portions 72 of the second cover member 7, the non-cutout portions 72 that are not fixed to the output shaft 3 and divided by the cutout portions 71 continuous with the axis center hole 74 are reinforced. Therefore, the structural strength of the second cover member 7 is improved without extending the intervals between the temperature compensator coil 9 and the covered member 5 and without increasing a thickness of the second cover member 7.

Figure 20:
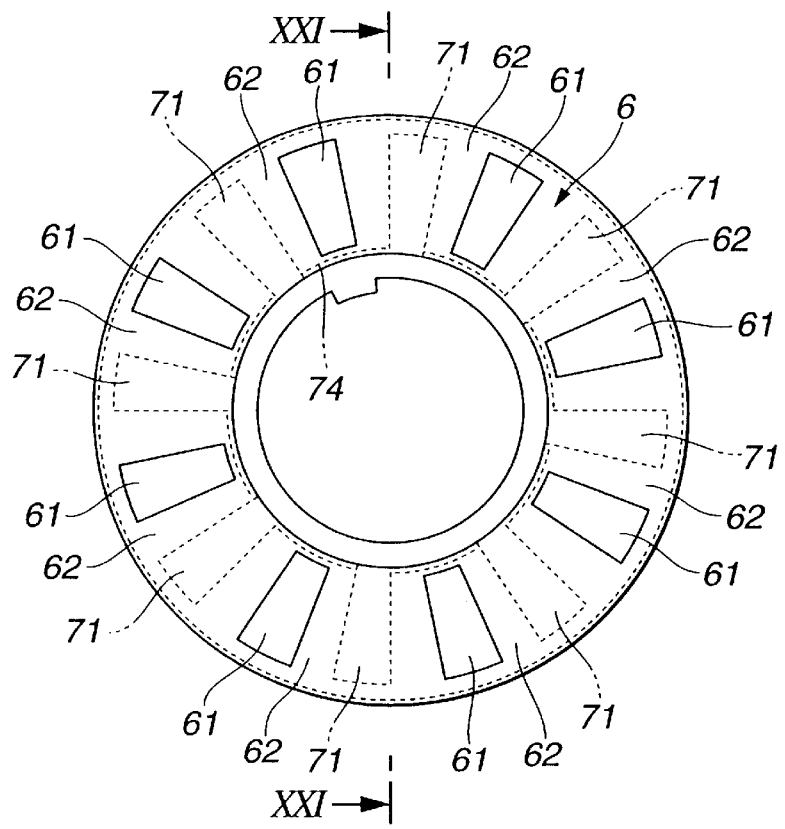
FIG. 20 is a front view showing the cover members of the torque sensor according to a fifth embodiment of the present invention.
Figure 21:
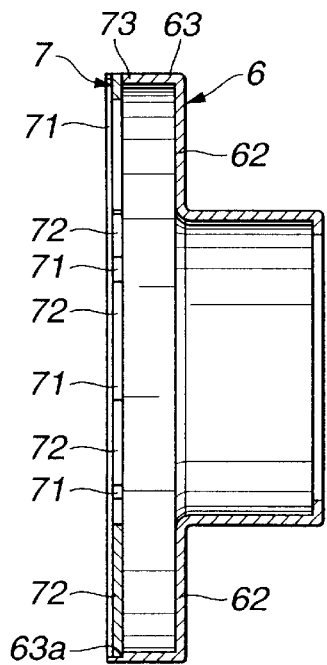
FIG. 21 is a cross sectional view taken in the direction of arrows substantially along the line XXI—XXI of FIG. 20.

Referring to FIGS. 20 and 21, the torque sensor 20 of a fifth embodiment according to the present invention will be discussed. The fifth embodiment is a modification of the third embodiment.

In contrast to the arrangement of the third embodiment that the outer cylinder portion 73 of the second cover member 7 is overlapped with the outer cylinder portion 63 of the first cover member 6 around the covered member 5, the torque sensor 20 of the fifth embodiment according to the present invention is specifically arranged as to the outer cylinder portion 63. More specifically, in the fifth embodiment, the outer cylinder portion 63 of the first cover member 6 is further extended so as to act as the outer cylinder portion 73 of the second cover member 7, and an annular stepped portion 63a is formed at a tip end portion of the outer cylinder portion 63. Further, the second cover member 7 of a disc shape is fixedly installed to the annular stepped portion 63a.

With this arrangement of the fifth embodiment, the advantages gained by the third embodiment are also ensured.

Figure 22:
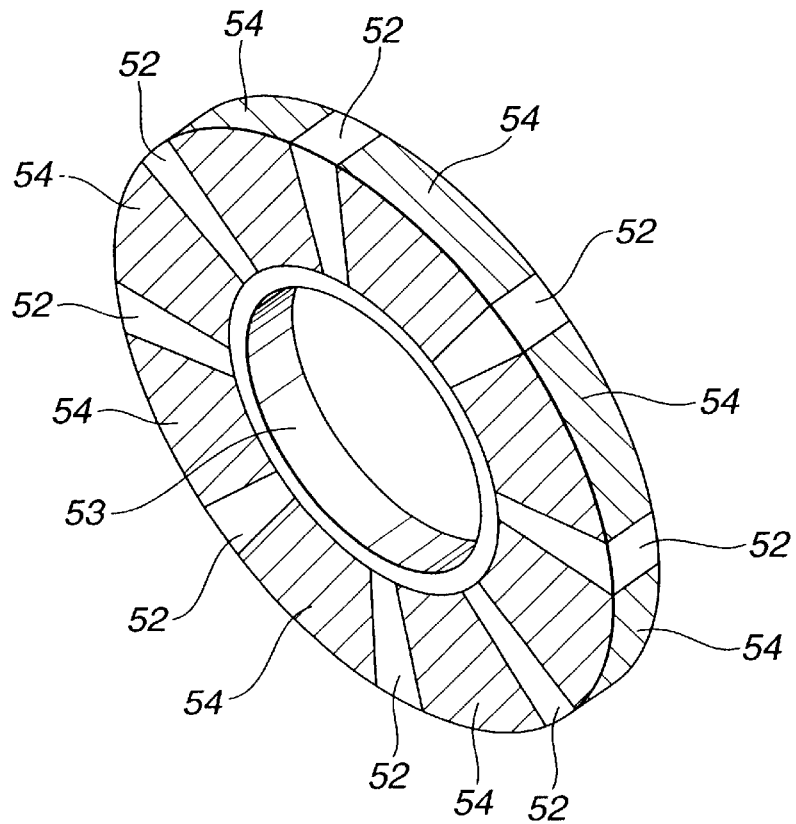
FIG. 22 is a perspective view showing the covered member of the torque sensor according to a sixth embodiment of the present invention.

Referring to FIG. 22, there is shown a sixth embodiment of the torque sensor 20 according to the present invention. The sixth embodiment shows a modification common to the first, third, fourth and fifth embodiments.

The torque sensor 20 of the sixth embodiment is specifically arranged such that members 54 made of an electrically conductive and non-magnetic material such as aluminum are set at the cutout portions 51 of the covered member 5, respectively as shown in FIG. 22.

With this arrangement of the sixth embodiment, a part of the magnetic flux to be passed through the cutout portions 51 is reflected as a magnetic flux due to eddy current of the non-magnetic material members 54. Accordingly, the variation of the impedance detected by the temperature compensator coil 9 is increased by the reflected quantity of the magnetic flux. Therefore, this arrangement enables the detection accuracy of the torque to be improved.

Figure 23:
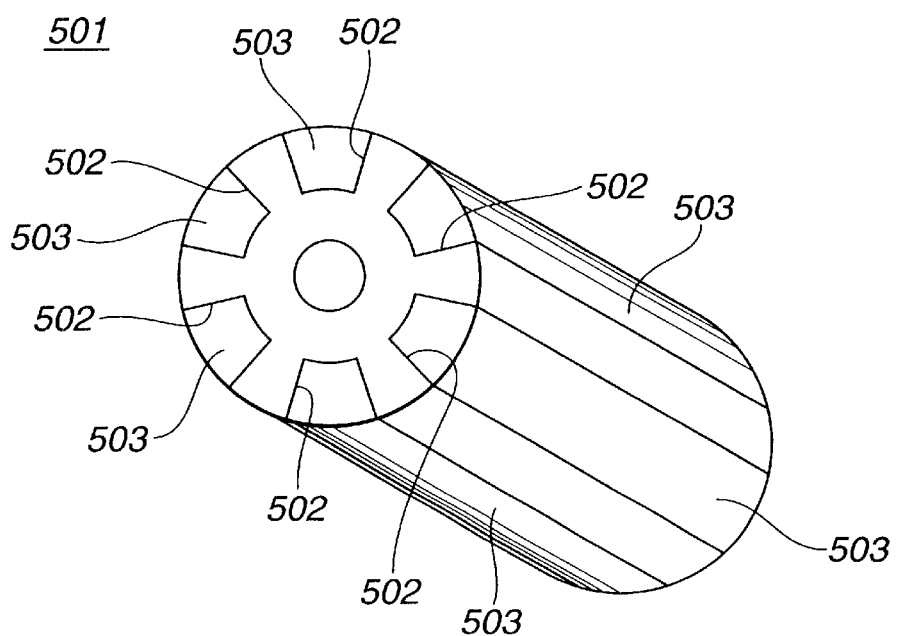
FIG. 23 is a perspective view showing the covered member of the other embodiment.

Although the sixth embodiment according to the present invention has been shown and described such that the covered member 5 and both of the first and second cover members 6 and 7 are formed into a disc shape and are arranged along the axial direction, the covered member 501 and the cover member (not shown) are formed into a cylindrical shape by disposing the member 503 of non-magnetic material in to the cutout portions 502 as shown in FIG. 23, and are opposed in the diametrical direction. Such an arrangement of the covered member 503 ensures the advantages gained by the other embodiments.

Although the preferred embodiments according to the present invention have been shown and described on the basis of the drawings, the concrete construction thereof is not limited to the preferred embodiments and may be modified in design without departing from the spirit and the scope thereof.

For example, although the preferred embodiments according to the present invention have been shown and described to be adapted to a torque sensor of an electric power steering apparatus of a vehicle, the invention is not limited to this and may be adapted to the other apparatus for detecting a torque generated at a rotation shaft.

Further, although the preferred embodiments according to the present invention have been shown and described such that the cutout portions 51 of the covered member 5 are formed so as to penetrate in the axial direction, the cutout portions 51 may be formed into grooves. Furthermore, although the preferred embodiments according to the present invention have been shown and described such that the cover member 6 is installed to the input shaft 2 and the covered member 5 is installed to the output shaft 3, they may be inversely installed such that the cover member 6 is installed to the output shaft 3 and the covered member 5 is installed to the input shaft 2.

The entire contents of Japanese Patent Application No. 2000-310774 filed on Oct. 11, 2000 in Japan are incorporated herein by reference.

Although the invention has been described above by reference to a certain embodiment of the invention, the invention is not limited to the embodiments described above. Modifications and variations of the embodiment described above will occur to those skilled in the art, in light of the above teaching. The scope of the invention is defined with reference to the following claims.

What is claimed is:

1. A torque sensor comprising:
    a first shaft;
    an elastic member;
    a second shaft connected to the first shaft through the elastic member;
    a covered member fixed to the first shaft, the covered member being made of magnetic material and comprising a plurality of cutout portions which are formed at predetermined intervals in a circumferential direction of the covered member, the cutout portions being located on at least one of both covered-member side surfaces perpendicular to an axis of the first shaft;
    a cover member fixed to the second shaft, the cover member being faced with a plane including the cutout portions of the covered member, the cover member being made of conductive and non-magnetic material, the cover member comprising a plurality of cutout portions which are formed corresponding the cutout portions of the covered member;
    a detector coil positioned relative to the covered member so as to detect a change of an overlapped quantity between the cutout portions of the covered member and the cutout portions of the cover member on the basis of a change of an impedance as a torque quantity generated between the first and second shafts; and
    an outer cylinder portion integrally connected to an outer periphery of the cover member, the outer cylinder portion extending from the outer periphery of the cover member along an outer circumference of the covered member.

2. The torque sensor as claimed in claim 1, wherein the cutout portions of the covered member are disposed on the both covered-member side surfaces and the cover member comprises first and second cover members which are faced with the both covered-member side surfaces respectively, the first cover member being fixed to one of the first and second shafts, the outer cylinder portion integrated with the first cover member being connected to an outer cylinder portion integrated with the second cover member, an overlapped quantity between the cutout portions of the first cover member and the cutout portions of the covered member being increased according to a relative rotation between the first and second shafts, and an overlapped quantity between the cutout portions of the second cover member and the cutout portions of the covered member being decreased according to the relative rotation between the first and second shafts, the detector coil comprising first and second coils which are disposed opposite to the first and second cover members in the axial direction, respectively.

3. The torque sensor as claimed in claim 2, wherein the cutout portions of the second cover member are formed into a shape through which the covered member is disposed between the first and second cover members.

4. The torque sensor as claimed in claim 2, wherein a plurality of reinforcement ribs are formed at portions of the second cover member which portions define the cutout portions.

5. The torque sensor as claimed in claim 1, wherein a dimension of the covered member in the axial direction is greater than a dimension of the cover member in the axial direction.

6. The torque sensor as claimed in claim 1, wherein the cutout portions of the covered member are filled with non-magnetic material.

7. The torque sensor as claimed in claim 1, further comprising an auxiliary cover member fixed to the second shaft, the auxiliary cover member being opposite to the cover member through the covered member, the outer cylinder portion integrated with the cover member being connected to an outer periphery of the auxiliary cover member.

8. The torque sensor as claimed in claim 7, further comprising a temperature compensator coil is located opposite to the covered member through the auxiliary cover member.

9. The torque sensor as claimed in claim 1, wherein the detector coil varies a magnetic field generated between the detector coil and the covered member according to the change of the overlapped quantity of the cutout portions of the covered member relative to the cutout portions of the cover member, the detector coil outputting the change of the magnetic field as an impedance change indicative of a torque quantity.

10. The torque sensor as claimed in claim 1, further comprising a housing which rotatably supports the first and second shafts, the detection coil being fixed to the housing.

11. A torque sensor for an electric power steering apparatus, comprising:
    a housing;
    a first shaft rotatably supported by the housing;
    an elastic member connected to the first shaft;
    a second shaft connected to the first shaft through the elastic member;
    a covered member fixed to the first shaft, the covered member being made of magnetic material and having a plurality of cutout portions formed at predetermined intervals in a circumferential direction of the covered member;
    a cover member disposed at a side of the covered member in the axial direction, the cover member being fixed to the second shaft, the cover member being faced with a plane including the cutout portions of the covered member, the cover member being made of conductive and non-magnetic material, the cover member comprising a plurality of cutout portions which are formed corresponding the cutout portions of the covered member, the cover member comprising an outer cylinder portion extending from an outer periphery of the cover member along an outer circumferential direction of the covered member; and
    a detector coil fixed to the housing, the detector coil measuring a twist quantity of the elastic member by detecting a change of an overlapped quantity between the cutout portions of the covered member and the cutout portions of the cover member.

12. A torque sensor comprising:
    an input shaft;
    a torsion bar;
    an output shaft connected to the input shaft through the torsion bar;
    a covered member fixed to the output shaft, the covered member being made of magnetic material and having a plurality of cutout portions formed at predetermined intervals in a circumferential direction of the covered member;
    a cover member fixed to the input shaft, the cover member being opposite to a plane including the cutout portions of the covered member, the cover member being made of conductive and non-magnetic material and having a plurality of cutout portions which are formed corresponding the cutout portions of the covered member;

a detector coil installed around the input shaft, the detector coil varying a magnetic field generated between the detector coil and the covered member according to a change of an overlapped quantity between the cutout portions of the covered member and the cutout portions of the cover member and outputting the change of the magnetic field as an impedance change indicative of a torque quantity; and the cover member comprising an outer cylinder portion which extends from an outer periphery of the cover member along an outer circumferential direction of the covered member.

* * * * *